Dec. 25, 1956     C. H. FLUBACKER     2,775,679
ICE DETECTION SYSTEM
Filed Sept. 27, 1954     2 Sheets-Sheet 1
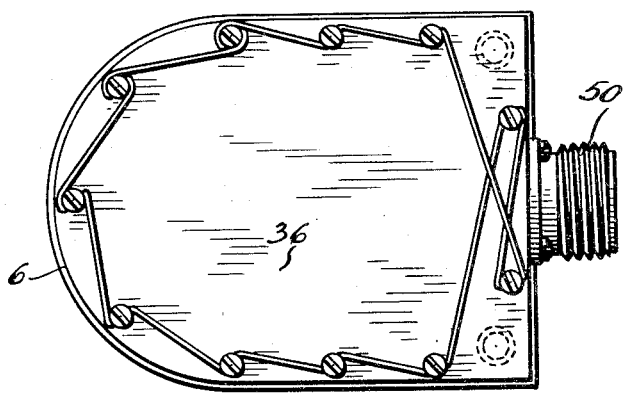
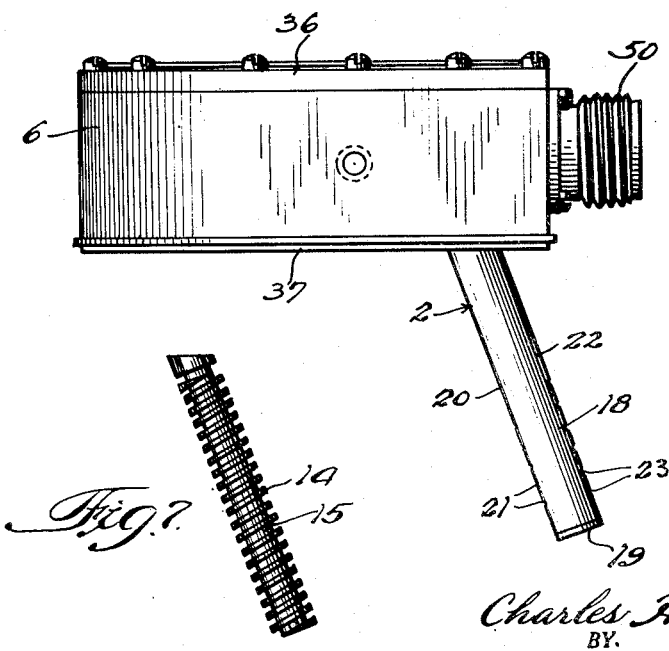
INVENTOR.
Charles H. Flubacker
BY
Thiess, Olsen, Mecklenburger, van Holst & Coltman Dec. 25, 1956  C. H. FLUBACKER  2,775,679
ICE DETECTION SYSTEM
Filed Sept. 27, 1954  2 Sheets-Sheet 2
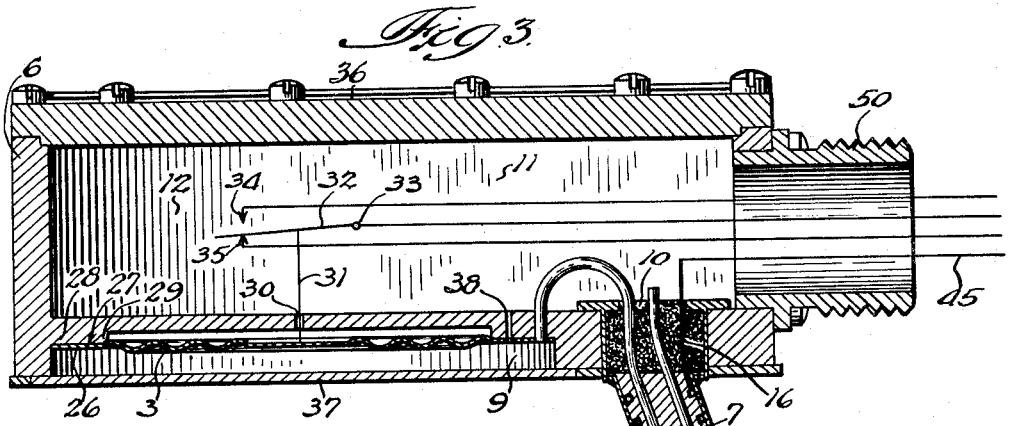
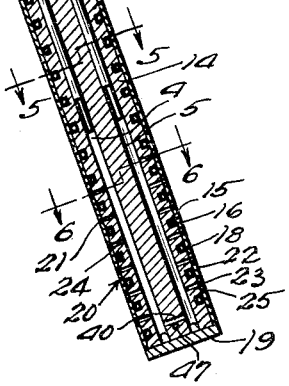
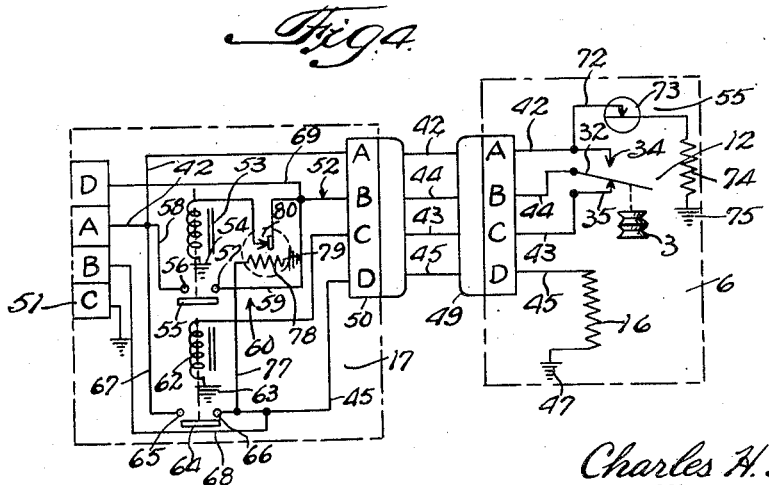
INVENTOR.
Charles H. Flubacker.
BY
Thiess, Olson, Mecklenburger,
von Holst, & Coltman. ATTYS.

United States Patent Office 2,775,679
Patented Dec. 25, 1956

2,775,679

ICE DETECTION SYSTEM

Charles H. Flubacker, Chicago, Ill., assignor to Cook Electric Company, Chicago, Ill., a corporation of Illinois Application September 27, 1954, Serial No. 458,440

11 Claims. (Cl. 219—20)

This invention relates to an ice detecting system, and more particularly to a system and apparatus for detecting the formation of ice upon moving vehicles such as airplanes or the like.

This invention is directed to such a system and apparatus capable of accurate operation over substantial periods and under a wide range of climatic conditions.

The invention in one of its more specific aspects resides in the use of a probe or the like wherein an impact pressure proportional to the air velocity is created and vented to the diaphragm of a differential pressure switch. The formation of ice upon the probe is relied upon to cause failure of the impact pressure and on the immediate operation of the differential pressure switch whereby a signal is created and a heating circuit is operated to clear the ice from the probe and to indicate thereby a continuing icing condition, if such should exist.

Apparatus of this type may include a probe having a greater preforated area along its leading edge than along its trailing edge and an expansible diaphragm adapted to be actuated by impact pressure created by air flow whereby a condition of no air flow caused by an icing condition closing off the perforations in the leading edge of the probe can be immediately utilized through an expansible diaphragm to indicate this icing condition and the need to resort to corrective measures before impairment of engine performance.

Specifically, a control circuit may be actuated by the action of the diaphragm of the differential switch upon failure of impact pressure whereby to close a heating circuit that may include the probe itself so that heat created by the current flow through the heating circuit may be used to melt the ice upon the probe to clear the perforations along its leading edge.

To effect quick de-icing of the probe, which is necessary for satisfactory operation of a de-icing system, and afford the proper safety in flight for the ships, a heater of substantial capacity may be employed at the probe so that de-icing of the probe will occur in a few seconds. It is quite obvious that this heater should not remain energized for a long period. If the heater remains energized for a long period, burning out the heating coil and damaging the probe as well as surrounding equipment will occur. It is not satisfactory to place the de-icing system under a separate circuit control because it is desirable to keep the de-icing system under the control of the master switch of the airplane, which guarantees that the de-icing system will be in operation whenever the airplane is in flight.

Cross-country trips with stopovers enroute require parking of the airplanes for considerable periods. Lack of air flow when airplanes are not in motion also causes failure of impact pressure in the probe. During these parking periods it is generally necessary that the ships remain serviced. Included in this servicing is current for lighting, ventilation and certain of the other controls, all of which require the master switch to remain in closed position. A problem thereby arises in the operation of the heating circuit of the de-icing system during these periods of parking because continued operation of the heating circuit caused by lack of impact pressure in the probe would burn out the heater and probably cause other damage.

It is an object of the invention to provide a system of circuit control that automatically disconnects the heating circuit upon failure of impact pressure due to non-movement of the ship during periods of parking or when the master switch remains closed and the engines are not running, and which will at the same time keep the de-icing system in a state ready for immediate functioning as soon as the ship is again in motion.

A further object of the invention is to provide an improved circuit arrangement for the aforesaid differential pressure switch whereby it will be immediately energized upon impact pressure being established in the probe through movement of the ship. To this end, this invention contemplates what is termed an arming circuit adapted to energize this switch upon impact pressure in the probe. A holding circuit is provided to lock the arming circuit closed whereby the switch will remain energized to close the heating circuit promptly upon being moved from its impact pressure position to its position closing the heating circuit when impact pressure fails in the probe due to formation of the ice thereon or non-movement of the airship.

A still further object of the invention is specifically to embody a thermally controlled circuit breaker in the aforesaid circuit arrangement that will temporarily open the arming circuit long enough to de-energize this arming circuit and, therefore, the pressure switch by the heat effects of the current flow through the heating circuit after the heating circuit is closed a predetermined period. After the arming circuit has thus been opened and the pressure switch has been thereby de-energized, the arming circuit is restored to normal condition so that it can again energize the pressure switch upon the latter being moved to impact pressure position.

This arrangement novelly provides a simple circuit structure that keeps the de-icing system constantly armed so that it will function to apply heat to the probe to melt ice formed thereon as atmospheric conditions require while airships are in flight. However, if an airship should land and be out of flight with continued failure of impact pressure beyond a period that represents the normal time required to heat the probe and melt ice formed thereon, the arming circuit is de-energized which automatically de-energizes the switch and opens the heating circuit. The holding circuit for the arming circuit is broken but the normal condition of the arming circuit is immediately restored so that it can again close when impact pressure is restored in the probe by the airship resuming flight.

Other objects and advantages of the invention will be apparent from the following detail description when taken in connection with the following drawings which form a part hereof.

In the drawings:

Figure 1 is a top elevation of a structure embodying the present invention;

Fig. 2 is a side view of the structure;

Fig. 3 is a transverse section of the same;

Fig. 4 is a wiring diagram embodying the invention;

Fig. 5 is a sectional view taken along line 5—5 of Fig. 3;

Fig. 6 is a sectional view taken along line 6—6 of Fig. 3; and

Fig. 7 is a detail view of the core of the probe.

The apparatus disclosed herein comprises a probe 2 and a flexible wall 3 in the form of a diaphragm adapted to respond to pressure changes in passages 4 and 5 forming a part of this probe 2. Probe 2 is preferably attached to a housing 6 and passages 4 and 5 continue into this housing in the form of tubes 7 and 8 which are anchored as shown in passages 4 and 5 and which extend upwardly, the tube 7 bending upwardly and downwardly to communicate with a pressure chamber 9 and the tube 8 extending up through wall 10 into a compartment 11 in which a differential pressure switch 12 is disposed.

Probe 2 comprises the subject matter disclosed and claimed in copending application Serial No. 474,841 filed December 13, 1954. It includes a rod 14 having a spiral groove 15 cut therein to receive wire 16 of the heating circuit designated broadly as 17. A sleeve 18 of relatively thin wall structure is adapted to enclose rod 14 and uniquely keep heating wire 16 securely disposed within its groove 15. Passages 4 and 5 extend to the outer tip of rod 14 but they are sealed at this tip by a closure disk 19 suitably secured in sealed relation to the end of rod 14 and sleeve 18. Lead edge 20 is provided with a plurality of perforations 21 while trailing edge 22 is provided with a plurality of perforations 23. Perforations 21 and 23 are formed by cutting a plurality of transverse passages 24 and 25 inwardly to communicate with passages 4 and 5, respectively.

Diaphragm 3 is suitably sealed at its periphery 26 to surface 27 of a wall 28. Surface 27 comprises the face of a raised annular shoulder 29. Wall 28 is provided with a central opening 30 through which extends a pin or rod 31 secured at one end to diaphragm 3 and at the other end to a movable switch arm 32 suitably pivoted, say, at 33, it being understood that this particular construction may vary according to the requirements of a particular installation. Switch arm 32 is adapted to swing back and forth to engage either contact 34 or contact 35, this depending upon the position of diaphragm 3. Compartment 11 is closed off by a cover 36 suitably secured to housing 6. Chamber 9 may be closed off by a plate 37 likewise secured to housing 6. A small bleed passage 38 is provided in wall 28 to place chamber 9 in communication with compartment 11 so that the pressures in chamber 9 and compartment 11 will equalize when impact pressure in apertures 21 fails. A smaller bleed passage 40 is provided near the tip of rod 14 between passages 4 and 5. It will be noted that this impact pressure occurring in passage 4 will increase the pressure in chamber 9 and flex diaphragm 3 upwardly to swing switch blade 32 into engagement with contact 34. As long as this impact pressure continues, switch blade 32 will remain in engagement with contact 34. However, if ice forms on the leading edge 20 of probe 2, which ice formation will cover apertures 21 of passages 24, the impact pressure will cease or fail and the pressure between chamber 9 and compartment 11 will equalize so as to allow diaphragm 3 to return to its normal position and move switch blade 32 into engagement with contact 35.

Referring now to the wiring diagram illustrated in Fig. 3, diaphragm 3 is diagrammatically illustrated as a flexible chamber that operates switch blade 32 between contacts 34 and 35 in the manner just described. Wires 42 and 43 connect to contacts 34 and 35, respectively, while wire 44 connects to switch blade 32. Heater wire 45 connects to the heater 16 which is illustrated as grounded at 47, this being shown also in Fig. 3 at the point where heater wire 16 is anchored crosswise in rod 14 at the bottom thereof in order to establish firm grounded contact.

Wires 42 to 45, inclusive, may lead out of a properly marked terminal block like that shown at 49, these wires then leading to a second terminal block or plug 50, both carrying preferably the same individual wiring designations so that no error will be made in making the connections.

Wire 42 leads to a source of current supply designated as A on terminal block 51. This wire 42, together with wire 44, constitutes an arming circuit 52 which includes a relay 53 grounded at 54. When switch blade 32 is moved to engage contact 34, the circuit is completed from the source of current supply A through wire 42 of the arming circuit, contact 34, switch blade 32, wire 44, and the coil of relay 53 to ground 54. Immediately, relay 53 is energized and switch 55 is closed at contacts 56 and 57. Contact 56 is connected by wire 58 to wire 42 leading to the source of current supply A. Contact 57 is connected by wire 59 to wire 52 connecting to relay 53. Wires 58 and 59, together with switch 55 and its contacts 56 and 57, constitute a holding circuit designated broadly as 60 to lock the arming circuit closed when switch blade 32 is raised to engage contact 34. Thus switch blade 32 is energized when impact pressure occurs in passage 4 of probe 2 and chamber 9 of pressure switch 12.

No further action occurs while impact pressure exists in probe 2 and chamber 9. However, if this impact pressure fails by reason of the fact that ice forms on the leading edge 20, switch blade 32 will drop to engage contact 35 as illustrated in Fig. 3. This immediately energizes a circuit which includes wire 43 and a second relay 62 grounded at 63. Actuation of relay 62 closes switch 64 at contacts 65 and 66. Switch 64 and its contacts 65 and 66 are preferably in heating circuit 17 which includes wire 45 and heating coil 16 grounded at 47.

A wire 67 connects contact 65 to wire 42 and the source of current supply A. A signal lamp or audible signal B may be connected in the heating circuit by wire 68 extending between this signal B and wire 45. A wire 69 connected to wire 44 may lead to an arming light D adapted to indicate when arming circuit 52 is closed and switch arm 32 of differential pressure switch 12 is energized.

It has been found desirable to maintain a temperature at housing 6 at approximately 55° F. To this end a wire 72 may connect to wire 42 that connects directly to the source of current supply A and then to a thermostat 73. Thermostat 73 may then be connected to an auxiliary heating coil 74 grounded at 75.

From the foregoing description, it will be apparent that impact pressure at apertures 21 of leading edge 20 of probe 2 will impose a pressure on the underside of diaphragm 3 in excess of the pressure in compartment 11 which communicates through hole 30 with the opposite side of diaphragm 3. This impact pressure will flex diaphragm 3 upwardly and swing contact arm 32 into engagement with contact 34. This immediately establishes a circuit from source of current supply A, wire 42, contact 34, switch arm 32, wire 44 of arming circuit 52, relay 53, and to ground at 54. When arming circuit 52 is thus closed, switch 55 is closed through actuation of relay 53. Current will then flow from source of current supply A through wire 58, contact 56, switch 55, contact 57, wire 59 and return through ground 54 of relay 53. The circuit constitutes a holding circuit to keep relay 53 energized, and, consequently, the arming circuit 52. At this time, current will also flow from wire 59 through wire 69 to the arming light D thereby indicating to the pilot that the arming circuit 52 is closed. This condition continues as long as impact pressure is imposed upon apertures 21 and diaphragm 3, this being, of course, a condition that will prevail while the airplane is in flight and the motors are operating at, say, a speed in excess of 47 miles per hour. If climatic conditions are conducive to ice formation during flight of the airplane, ice will form upon leading edge 20 of probe 2. This ice formation will block apertures 21 and the pressure existing at the time in passage 4 and chamber 9 will equalize with the pressure in compartment 11 by reason of the bleed passages 38 and 40. This equalization of pressure returns diaphragm 3 to its original position and brings switch arm 32 into engagement with contact 35. It will be observed that switch arm 32 remains energized during the period of movement from its engagement with contact 34 to its engagement with contact 35. This is the result of arming circuit 52 remaining energized by virtue of holding circuit 60 which includes switch 55. Current will then flow from the source of current supply A through the holding circuit to wire 44 of arming circuit 52, through switch arm 32, contact 35, wire 43 to the second relay 62 and back to ground 63. Relay 62 will immediately be energized to cause switch 64 to close the contacts 65 and 66. Current will then flow from source of current supply A through wire 67, switch 64, wire 45, heating wire 16 of probe 2 and to ground 47. Heater 16 is of substantial capacity, preferably in the neighborhood of 200 watts or so, in order to effect melting of ice formation on the surface of probe 2 within a short period, say, for example, of five seconds or so. This immediately restores impact pressure at apertures 21 and in passage 4 and chamber 9. Promptly diaphragm 3 operates switch arm 32 to a position engaging contact 34. Arming circuit 52 is still energized and remains energized as long as contact arm 32 engages contact 34. However, the heating circuit 17 is opened when switch arm 32 disengages contact 35 of switch 12. This results from relay 62 being de-energized and switch 64 being opened at contacts 65 and 66 to open heating circuit 17.

If climatic conditions continue to prevail that bring about continued formation of ice on the surface of probe 2, apertures 21 will again be covered and the impact pressure destroyed in passage 4 and chamber 9. Again, switch arm 32 will move into engagement with contact 35 to close heating circuit 17 through the energization of relay 62 and the closing of switch 64 at contacts 65 and 66. Again the heating circuit functions to melt the ice within the selected period. The heating circuit 17 will again be opened at contact 35 through the restoration of impact pressure at the apertures 21 and in chamber 9 as the ice is melted.

As previously stated herein, airships are frequently compelled to land and remain parked for substantial periods, even for more than an hour at times, with the various services such as lights, ventilation, and other vital controls in operation, thus requiring the master switch of the airplane to remain in closed position. The ice detecting system embodying the present invention should, like all other controls, be connected to the master switch so that the system will be capable of functioning as soon as the airplane is in flight without requiring the operation of a separate control by the pilot. This is a matter of safety to prevent any possibility of the ship being in flight without the system in operation through the failure of the pilot to close the separate control. When the airplane is parked, impact pressure will also fail at apertures 21 and in passage 4 and chamber 9. Pressures on opposite sides of diaphragm 3 will immediately equalize through bleed passages 38 and 40 so that switch 12 will be operated by diaphragm 3 to move its switch blade 32 to a position engaging contact 35. With a heater of 200 watts or so continuously closed during the parking period, it is quite obvious that the heater will burn out and undoubtedly create additional damage. To assure that the heater coil 16 will not burn out and be in condition for subsequent functioning when the airship is again in flight, current flowing through a wire 77 connected to wire 45 of the heating circuit 17 will flow through a resistance winding 78 that is grounded at its opposite end at 79. A thermally controlled switch 80 is then subjected to the heat effects of the current flow through this resistance winding 78. It will be observed that the current flow through wire 77 is the same as the current flow through wire 45 of heating circuit 17. The thermally controlled switch 80 may be set to open at a predetermined temperature which may be, say, with a time delay of from ten to fifteen seconds after the current first flows through resistance winding 78. This period may vary according to the requirements of an installation, but it is obvious that it will be in excess of the normal operation that opens and closes the heating circuit 17 to melt the ice formation on the surfaces of probe 2. The opening of thermally operating switch 80 will open arming circuit 52 as well as holding circuit 59 and will immediately de-energize relay 53. De-energizing relay 53 will open switch 55 of holding circuit 59. Thus the heating circuit 17 is immediately broken because switch arm 32 of switch 12 is de-energized when arming circuit 52 is opened. This discontinues the current flow through relay 62, thus opening switch 64 of heating circuit 17. Switch arm 32 will remain engaged with contact 35 as long as failure of impact pressure continues by reason of the fact that the airship is not in motion. The entire ice detecting system is thereby effectively disconnected from the master switch and the heating coil 16 protected from destruction, regardless of the period the airplane remains parked. However, movement of the airplane will again restore impact pressure at apertures 21 which promptly again causes diaphragm 3 to actuate switch arm 32 into engagement with contact 34. Arming circuit 52 is again energized and the operating condition of the entire system restored for prompt de-icing through the heating circuit 17 of any ice formation on the surface of probe 2 as the ship is again put into flight.

Without further elaboration, the foregoing will so fully explain the character of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. Apparatus for detecting the formation of ice on a moving vehicle including an ice forming surface adapted to be carried by said vehicle, an actuator having two positions, the first position being when said actuator is subjected to a predetermined wind pressure, the second position being when ice forms on said surface and when said actuator is not subjected to said predetermined wind pressure, an electric switch adapted to be actuated by said actuator, an arming circuit to energize said switch when said actuator is in its said first position, said arming circuit including a relay adapted to lock said arming circuit closed so that it will remain closed and the switch energized when said actuator moves to its said second position, a heating circuit for said surface, and a second relay to close said heating circuit, said second relay being actuated when said actuator moves to its said second position.

2. Apparatus for detecting the formation of ice on a moving vehicle including an ice forming surface adapted to be carried by said vehicle, an actuator having two positions, the first position being when said actuator is subjected to a predetermined wind pressure, the second position being when ice forms on said surface or when said actuator is not subjected to said predetermined wind pressure, an electric switch adapted to be actuated by said actuator, an arming circuit for energizing said switch when said actuator moves to its said first position and also when it moves to its said second position, a heating circuit for said surface, and means to close said heating circuit when said switch is actuated by said actuator into its said second position.

3. Apparatus for detecting the formation of ice on a moving vehicle including an ice forming surface adapted to be carried by said vehicle, an actuator having two positions, the first position being when said actuator is subjected to a predetermined wind pressure, the second position being when ice forms on said surface or when said actuator is not subjected to said predetermined wind pressure, an electric switch adapted to be actuated by said actuator, an arming circuit for energizing said switch when said actuator moves to its said first position and also when it moves to its said second position, a heating circuit for said surface, and a relay for closing said heating circuit, said relay being energized by said switch when said actuator moves to its said second position.

4. Apparatus for detecting the formation of ice on a moving vehicle including an ice forming surface adapted to be carried by said vehicle, an actuator having two positions, one of said positions being when said actuator is subjected to a predetermined wind pressure, the second position being when ice forms on said surface or when said actuator is not subjected to said predetermined wind pressure, an electric switch adapted to be actuated by said actuator, an arming circuit for energizing said switch when said actuator moves to its first position, said arming circuit including a relay adapted to be actuated by said switch to lock said arming circuit closed so as to keep said switch energized when said actuator moves to its said second position, a heating circuit for said surface, and a second relay for closing said heating circuit, said second relay being energized by said switch when said actuator moves to its said second position.

5. Apparatus for detecting the formation of ice on a moving vehicle including an ice forming surface adapted to be carried by said vehicle, an actuator, an electric switch under the control of said actuator, an arming circuit for energizing said switch, said actuator having provisions to actuate said switch to a position closing said arming circuit, means to lock said arming circuit closed and to keep said switch energized when the latter is moved by said actuator to a second position, and a heating circuit for heating said surface and melting the ice formed thereon, said heating circuit being closed by said actuator moving said switch to said second position.

6. Apparatus for detecting the formation of ice on a moving vehicle including an ice forming surface adapted to be carried by said vehicle, an actuator, an electric switch under the control of said actuator, an arming circuit for energizing said switch, said actuator having provisions to actuate said switch to a position closing said arming circuit, means to lock said arming circuit closed and to keep said switch energized when the latter is moved by said actuator to a second position, and a heating circuit for heating said surface and melting the ice formed thereon, said heating circuit being closed by said actuator moving said switch to said second position, and means for opening said arming circuit and for de-energizing said switch to open said heating circuit, said means being operable after said heating circuit has been closed a predetermined period.

7. Apparatus for detecting the formation of ice on a moving vehicle including an ice forming surface adapted to be carried by said vehicle, an actuator, an electric switch under the control of said actuator, an arming circuit for energizing said switch, said actuator having provisions to actuate said switch to a position closing said arming circuit, a holding circuit to keep said arming circuit closed and said switch energized when the latter is moved by said actuator to a second position, a heating circuit for heating said surface and melting the ice formed thereon, said heating circuit being closed by the movement of said switch to its said second position, and a thermal time delay controlled by the current flow through the circuit adapted to open said arming circuit after said heating circuit has been closed a predetermined period.

8. Apparatus for detecting the formation of ice on a moving vehicle including an ice forming surface adapted to be carried by said vehicle, an actuator, an electric switch under the control of said actuator, an arming circuit for energizing said switch, a heating circuit for heating said surface and melting the ice formed thereon, said switch having two positions, one position being to close said arming circuit, the second position being to close said heating circuit, a relay in said arming circuit and a holding circuit for said relay to keep said arming circuit closed when said switch is moved from its said first position to its said second position.

9. Apparatus for detecting the formation of ice on a moving vehicle including an ice forming surface adapted to be carried by said vehicle, an actuator, an electric switch under the control of said actuator, an arming circuit for energizing said switch, a heating circuit for heating said surface and melting the ice formed thereon, said switch having two positions, one position being to close said arming circuit, the second position being to close said heating circuit, a relay in said arming circuit, and means for opening said arming circuit and de-energizing said switch to open said heating circuit.

10. Apparatus for detecting the formation of ice upon a travelling vehicle comprising a probe exposed to the flow of air past the vehicle and to the ice that may form upon the vehicle, means establishing an impact pressure within said probe by said air flow and to cause said impact pressure to fail within said probe upon formation of ice thereon, or upon failure of said air flow being restored, a pressure responsive actuator connected to said probe, an electric switch controlled by said actuator, means to energize said switch upon establishment of said impact pressure, means to hold said switch energized upon failure of said impact pressure, a heating circuit for heating said probe and melting the ice thereon, said switch being operated by said actuator to close said heating circuit upon failure of said impact pressure and to open said heating circuit when said impact pressure is restored, and means for opening said heating circuit automatically upon failure of said impact pressure being restored after said heating circuit has been closed a predetermined period.

11. Apparatus for detecting the formation of ice upon a travelling vehicle comprising a probe exposed to the flow of air past the vehicle and to the ice that may form upon the vehicle, means establishing an impact pressure within said probe by said air flow and to cause said impact pressure to fail within said probe upon formation of ice thereon or upon failure of said air flow being restored, a pressure responsive actuator connected to said probe, an electric switch controlled by said actuator, means to energize said switch upon establishment of said impact pressure in said probe, means to hold said switch energized upon failure of said impact pressure, a heating circuit for heating said probe and melting ice formed thereon, said switch being operated by said actuator to close said heating circuit upon failure of said impact pressure and to open said heating circuit when said impact pressure is restored, and means controlled by the heat effects of the current flow in said heating circuit for opening said heating circuit upon failure of said impact pressure being restored after said heating circuit has been closed a predetermined period.

References Cited in the file of this patent

UNITED STATES PATENTS

| | | |
|---|---|---|
| 1,657,660 | Cedergren | Jan. 31, 1928 |
| 2,541,512 | Hahn | Feb. 13, 1951 |
| 2,656,525 | Kinsella | Oct. 20, 1953 |
| 2,679,004 | Dyke et al. | May 18, 1954 |
| 2,744,992 | Spears | May 8, 1956 |